(12) United States Patent
Hartle

(10) Patent No.: US 11,503,779 B1
(45) Date of Patent: Nov. 22, 2022

(54) SYSTEM FOR A HYDRAULIC TREE BRANCH SHEAR

(71) Applicant: Todd Hartle, Chicora, PA (US)

(72) Inventor: Todd Hartle, Chicora, PA (US)

( * ) Notice: Subject to any disclaimer, the term of this patent is extended or adjusted under 35 U.S.C. 154(b) by 295 days.

(21) Appl. No.: 16/655,952

(22) Filed: Oct. 17, 2019

(51) Int. Cl.
*A01G 23/085* (2006.01)
*A01G 23/087* (2006.01)
*A01G 3/08* (2006.01)

(52) U.S. Cl.
CPC ........... *A01G 23/085* (2013.01); *A01G 3/085* (2013.01); *A01G 23/087* (2013.01)

(58) Field of Classification Search
CPC .... A01G 23/087; A01G 3/085; A01G 23/091; A01G 3/08; Y10S 83/928
USPC ................ 144/34.1, 34.5, 24.13, 4.1; 83/928
See application file for complete search history.

(56) References Cited

U.S. PATENT DOCUMENTS

| | | | | |
|---|---|---|---|---|
| 3,340,612 A * | 9/1967 | Knight | ...................... | A01G 3/08 30/394 |
| 3,626,477 A * | 12/1971 | Fulghum, Jr. | ........ | A01G 23/087 144/34.1 |
| 5,378,852 A | 1/1995 | Manor | | |
| 6,968,877 B1 * | 11/2005 | Stokkeland | .......... | A01G 23/091 144/34.1 |
| 7,152,640 B1 * | 12/2006 | Williams | ............. | A01G 23/091 144/4.1 |
| 7,223,062 B1 * | 5/2007 | Emerson | ............... | E02F 3/3604 37/468 |
| 7,418,985 B2 * | 9/2008 | Torgersen | ................ | A01G 3/08 56/235 |
| 8,146,628 B2 * | 4/2012 | Tucker | ................. | A01G 23/087 144/4.1 |
| 9,220,204 B2 * | 12/2015 | Capers | ................. | A01G 23/091 |
| 2009/0014251 A1 * | 1/2009 | McCracken | ......... | A01G 23/095 187/272 |
| 2009/0120273 A1 * | 5/2009 | Eckdahl | .................. | F41H 13/00 89/36.08 |
| 2010/0131157 A1 * | 5/2010 | Kahle | ................... | E02F 9/2267 701/50 |
| 2019/0289789 A1 * | 9/2019 | Grice | ..................... | A01G 3/085 |

* cited by examiner

*Primary Examiner* — Laura M Lee
(74) *Attorney, Agent, or Firm* — Sanchelima & Associates, P.A.; Christian Sanchelima; Jesus Sanchelima

(57) ABSTRACT

A system for a hydraulic tree branch shear including a skid-steer loader and a shear assembly. The skid-steer loader of the system for a hydraulic tree branch shear may be an existing skid-steer loader adapter to have the shear assembly attached thereon. The shear assembly is powered by a hydraulic attachment that is configured to be powered from the skid-steer loader. Additionally, the controls for the shear assembly are configured to be attached to the existing controls of the skid-steer loader. The shear assembly is mounted to the skid-steer loader and allows a user to cut down hard to reach tree branches from the comfort of the skid-steer loader. Furthermore, the use of the skid steer loader provides a user protection from having tree branches falling on the user's head.

4 Claims, 4 Drawing Sheets

SYSTEM FOR A HYDRAULIC TREE BRANCH SHEAR

BACKGROUND OF THE INVENTION

1. Field of the Invention

The present invention relates to a system for a hydraulic tree branch shear and, more particularly, to a system for a hydraulic tree branch shear that is attached to a skid-steer loader and allows a user to utilize the skid-steer loader as a hydraulically powered tree branch shear.

2. Description of the Related Art

Several designs for a system for a hydraulic tree branch shear have been designed in the past. None of them, however, include a hydraulic tree branch shear attachment. Furthermore, the hydraulic tree branch shear attachment may be used with a skid loader for trimming tree branches. The device is controllable via remote hydraulics on a skid loader. It is known that individuals that live on large areas of land such as farms often are surrounded by a large number of trees. It is also known that these individuals have a need to regularly cut down the tree branches to prevent the trees from reaching into unwanted areas. This process can often be extremely time consuming and often requires a user to purchase expensive additional equipment and hire extra help. Therefore, there is a need for an easy to use system for a hydraulic tree branch shear that allows a user to effortlessly and safely cut down tree branches. The present invention introduces a shearing assembly that is mounted to a skid-steer loader to provide a user an efficient method of cutting down tree branches.

Applicant believes that a related reference corresponds to U.S. Pat. No. 5,378,852 issued for a tree and/or brush clearing and/or trimming equipment mounted on a tractor includes a rotary cutter provided with blades pivotally mounted on a rotating shaft and enclosed in a cutter housing open towards the plants to be cut. The cutter is mounted at the end of a multi-section arm, which arm is mounted on the tractor by a joint permitting both angular and rotational disposition of the cutter and the cutter housing, permitting both clearing of undergrowth around the tractor and cutting of low-growing branches or the like. However, it differs from the present invention because the U.S. Pat. No. 5,378,852 reference fails to provide an efficient system for cutting down tree branches located in tall areas that are hard to reach for an individual. The reference further fails to provide an efficient configuration of being mounted to a skid-steer loader. The present invention addresses these issues by providing a shear assembly that is effortlessly mounted to an existing skid-steer loader. The skid-steer loader coupled with the elongated body of the skid-steer loader allows a user to shear tree branches in hard to reach areas.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for a hydraulic tree branch shear system including a shear assembly that is effortlessly mounted to an existing skid-steer loader to aid a user in easily cutting down tree branches.

It is another object of this invention to provide a system for a hydraulic tree branch shear that provides a user a safe method of cutting down tree branches as the user is comfortably operating the shear assembly from within the skid-steer loader.

It is still another object of the present invention to provide a system for a hydraulic tree branch shear that aids a user in cutting down hard to reach tree branches and prevents the need of a user to purchase costly additional machinery to cut down tree branches.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
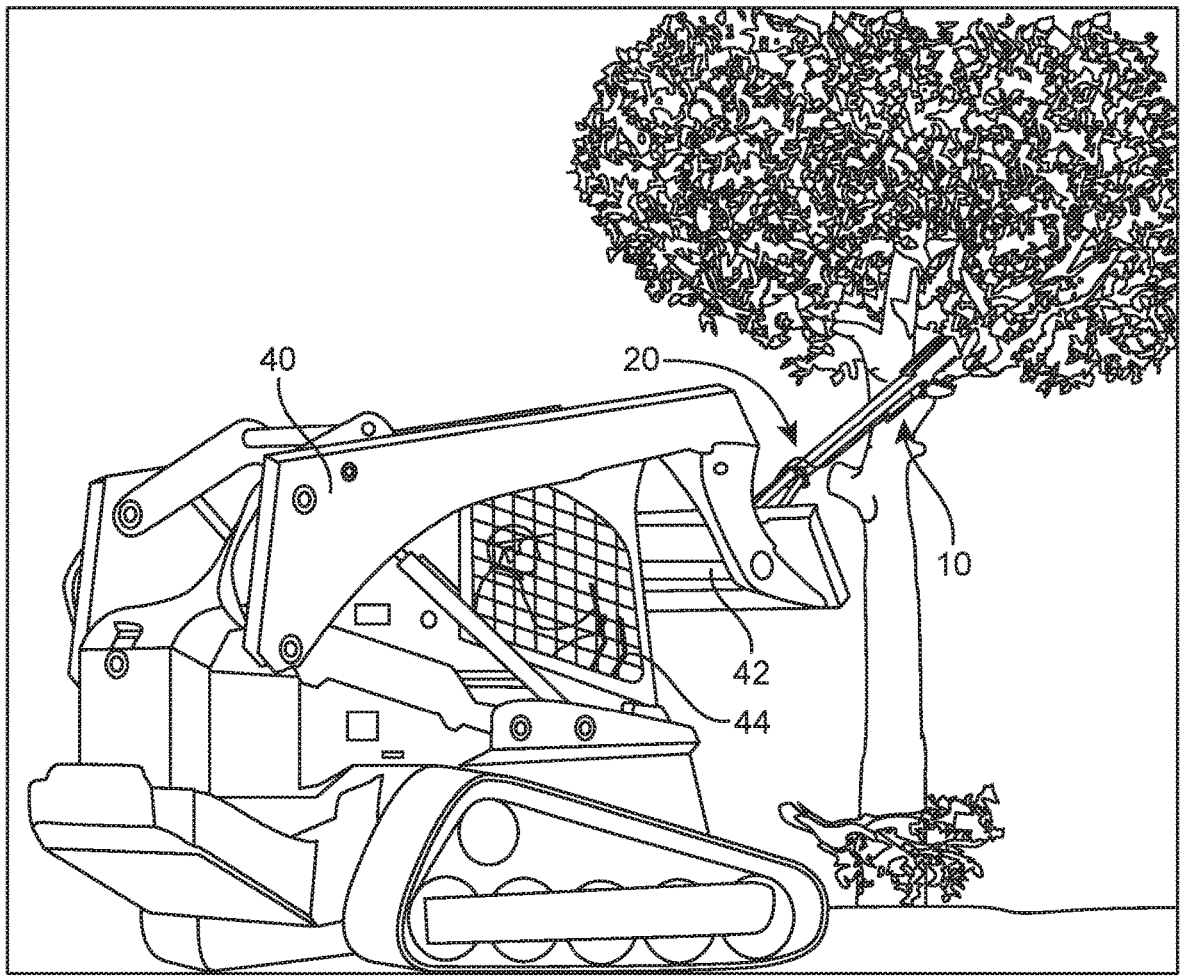
FIG. 1 represents an isometric view of a system for a hydraulic tree branch shear 10 in use having shear assembly 20 and skid-steer loader 40 in accordance to an embodiment of the present invention.
Figure 2:
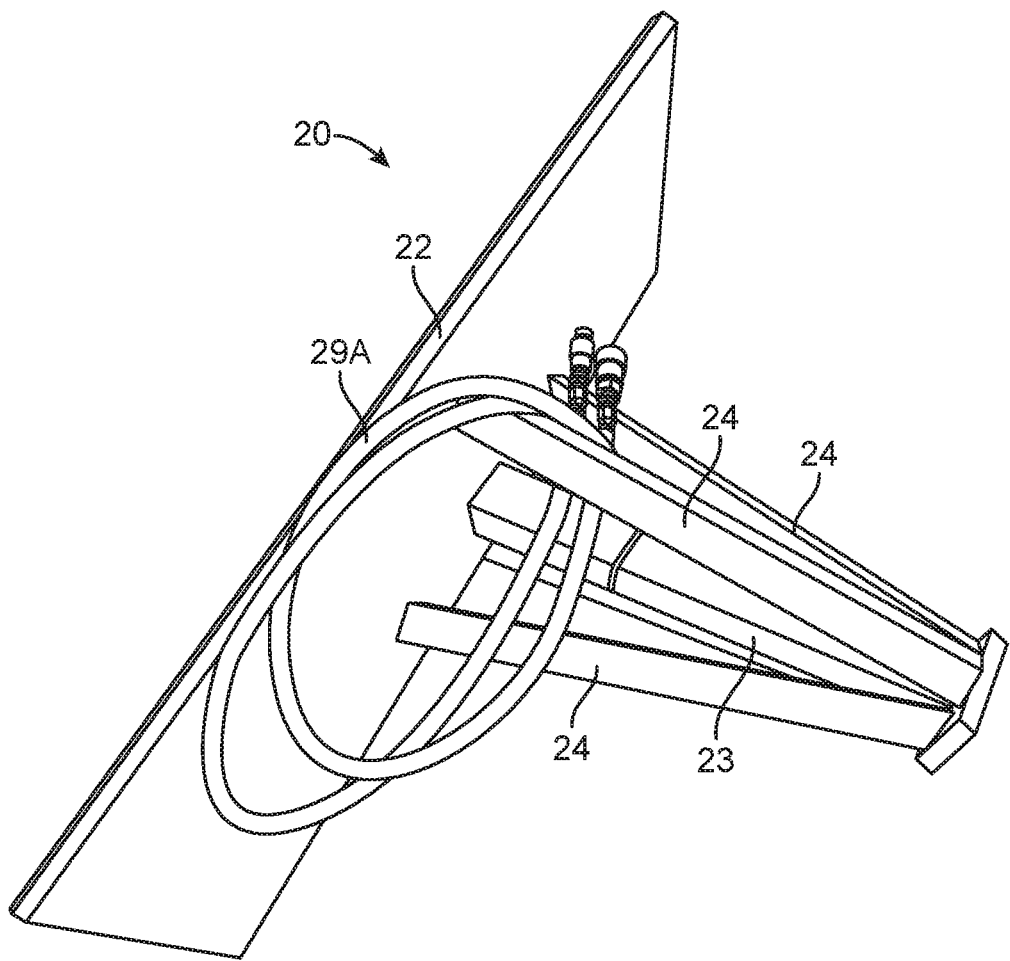
FIG. 2 shows an enlarged isometric view of shear assembly 20 wherein elongated body 23 may be seen attached to base 22 in accordance to an embodiment of the present invention.
Figure 3:
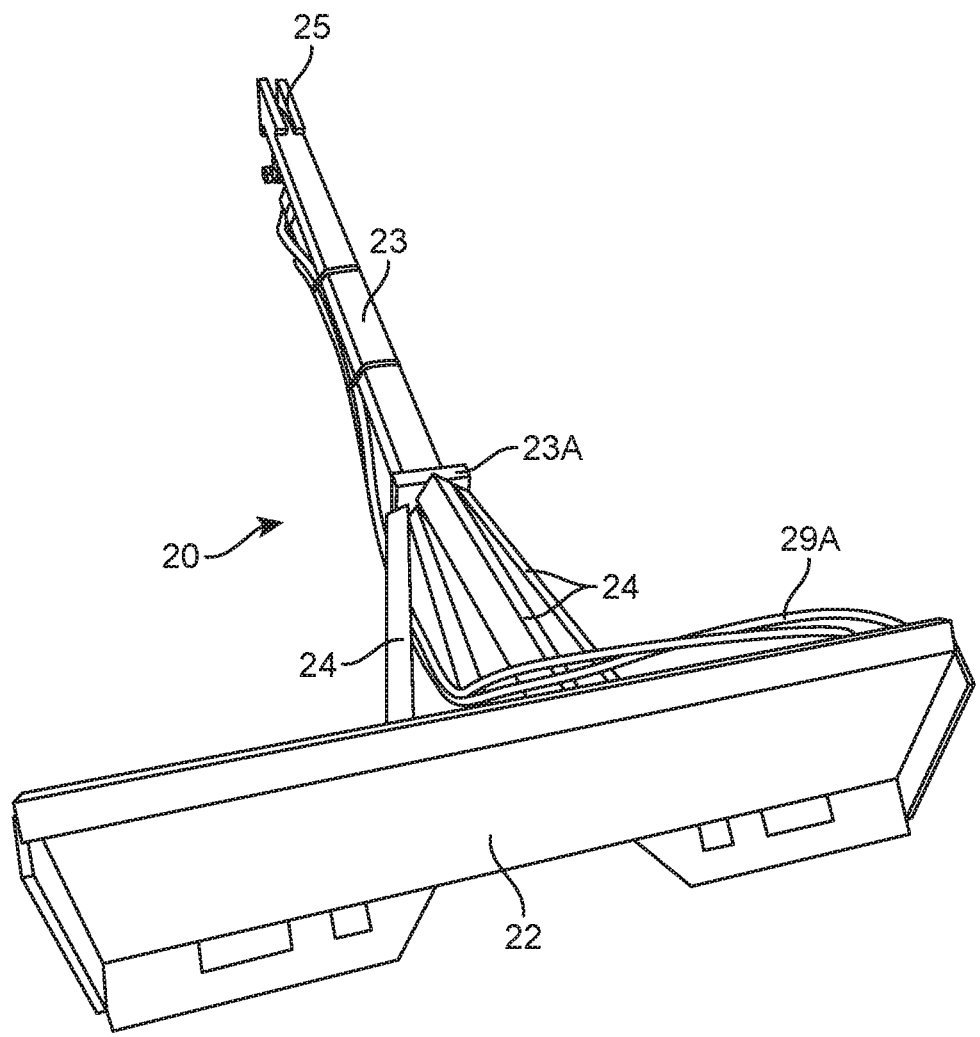
FIG. 3 illustrates an enlarged isometric rear view of shear assembly 20 in accordance to an embodiment of the present invention.
Figure 4:
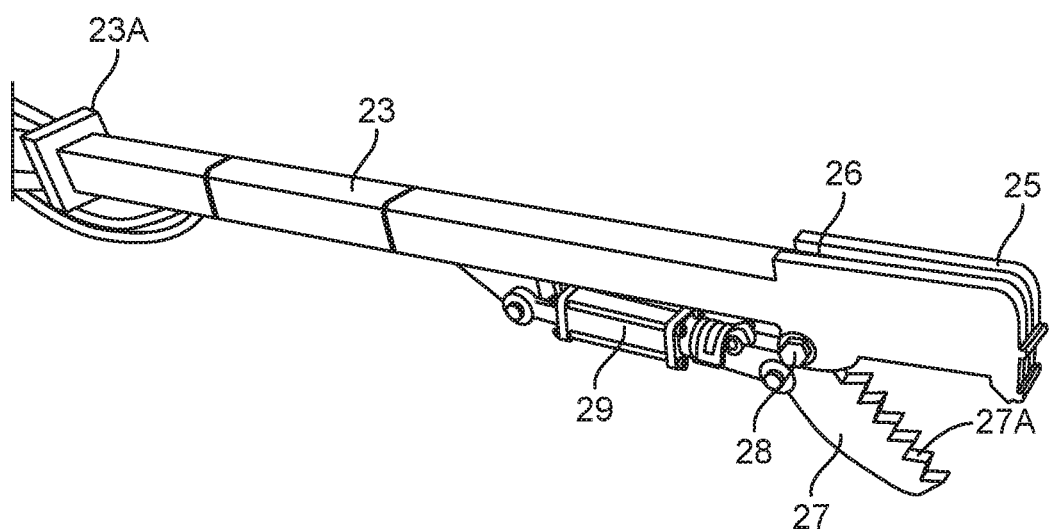
FIG. 4 is a representation of an enlarged isometric view of head 25 of shear assembly 20 in accordance to an embodiment of the present invention.

Referring now to the drawings, where the present invention is generally referred to with numeral 10, it can be observed a system for a hydraulic tree branch shear 10 that basically includes a shear assembly 20 and a skid-steer loader 40.

Shear assembly 20 includes a base 22 and an elongated body 23. Base 22 may be rectangular in shape and comprise of a suitable metal material. In a preferred embodiment base 22 is of a shape that cooperates with that of skid-steer loader 40. Elongated body 23 comprises an elongated cubic shape made of a suitable metal material. The elongated shape of elongated body 23 allows a user to reach hard to reach areas containing tree branches. Elongated body 23 is welded thereon a center portion of base 22. Elongated body 23 further includes an elongated body base 23 disposed near the end of elongated body 23. Elongated body base 23 comprises may comprise a square shape and is made of a suitable metal material. Shear assembly 20 further includes support members 24 mounted thereon base 22 and elongated body base 23A. In the present embodiment, support members 24 are welded thereon base 22 and elongated body base 23A.

Support members 24 are made of a suitable metal material and provide shear assembly 20 the necessary support needed to lift elongated body 23. Shear assembly 20 further comprises a head 25 disposed on elongated body 23. Head 25 is disposed on the end opposite to the end attached to base 22. Head 25 is further made of a suitable metallic material and may comprises of a rectangular shape including an open portion 26. Open portion 26 is open space disposed on the top end of head 25. Head 25 further includes a jaw 27 disposed on the bottom end of head 25. Jaw 27 is made of a suitable metallic material and further comprises teeth 27A thereon. Jaw 27 is of a suitable size to receive a tree branch therein. Furthermore, teeth 27A should be sharp in nature to aid a user in cutting through tree branches. It should be understood that any number of teeth 27A may be included on jaw 27 and is not limited to the number of teeth 27A depicted in the drawings. Jaw 27 is mounted thereon head 25 using a pivoting member 28 disposed on head 25. Pivoting member 28 allows jaw 27 to open and close thereby providing a snapping means for cutting tree branches. Shear assembly 20 further includes a hydraulic attachment 29 attached to jaw 27. Hydraulic attachment 29 as known in the art provides the necessary closing force to jaw 27 for cutting down tree branches. Hydraulic attachment 29 further comprises hydraulic lines 29A to communicably mount hydraulic attachment 29 to skid-steer loader 40.

Shear assembly 20 is mounted unto skid-steer loader 40. Skid-steer loader 40 includes bucket couplers 42 thereon. Base 22 of shear assembly 20 is mounted onto skid-steer loader 40 using bucket couplers 42. In the present embodiment, bucket couplers 42 are existing bucket couplers located on skid-steer loader 40. Skid-steer loader 44 further includes controls 44 thereon. In the present embodiment, controls 44 are existing controls located on skid-steer loader 40. In system for a hydraulic tree branch shear 10 shear assembly 20 is mounted onto skid-steer loader 40 thereon. A user mounts base 22 to skid-steer loader 40 using bucket couplers 42. Once safely secured, a user may then attach hydraulic lines 29A to existing controls 44 of a skid-steer loader 40. Afterwards, a user may then utilize skid-steer loader 40 to operate shear assembly 20. A user can operate skid-steer loader 40 to position head 25 into a tree branch a user desires to cut off. Once head 25 is properly positioned on a tree branch, a user may then use controls 44 to actuate jaw 27. Once actuated jaw 27 clamps down on head 25 using the hydraulic power supplied by skid-steer loader 40. The resulting force coupled with the sharp edges of teeth 27A allows a user to efficiently and effortlessly cut down a tree branch. A user may continue to operate skid-steer loader 40 having shear assembly 20 thereon to cut down any number of desired tree branches.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a hydraulic tree branch shear, comprising:
   a. a shear assembly, including a base and an elongated body, wherein said elongated body further includes an elongated body base being rectangular in shape, said elongated body has an elongated cubic shape, said base being rectangular in shape, said elongated body being welded to the center of said base, said shear assembly further including support members being disposed on said base and further connected to said elongated body, said shear assembly further including a head, the elongated body extends at least twice a length of the support members, said head further including a jaw configured to cut down tree branches, said jaw being mounted to said head using a pivoting member, wherein said jaw further includes a plurality of teeth located along a top surface of said jaw, wherein said teeth are triangular in shape and extend the entire width of said jaw, teeth are placed on a same plane, wherein said shear assembly further including a hydraulic attachment configured to actuate said jaw, said support members surround a perimeter of said elongated body, said support members are weld to said base and to said elongated body base, said support members extend at least a length of said elongated body, said elongated body has a greater width than said elongated body, said support members radially extend at an acute angle from said base to said elongated body base, said head has a corner between a top edge of said head and a front face of said head, the top edge of the head is defined by two sidewalls having a channel in between of a predetermined depth, said channel extends continuously from said top edge down through the front face of the head, said teeth are positioned to move towards said head when activated, the head and the jaw cooperate to create an angle between them, wherein said angle is closed as the jaw is actuated towards the head, said hydraulic attachment is connected directly to a proximal end of said jaw, said hydraulic attachment is substantially parallel to said elongated body, said elongated body is on a same axis as said head; and
   b. a skid-steer loader, including bucket couplers and controls, wherein said shear assembly is mounted to said skid-steer loader, said bucket couplers provide support to said base.

2. The system for a hydraulic tree branch shear of claim 1 wherein said hydraulic attachment further includes hydraulic lines to be mounted to said controls of said skid-steer loader.

3. The system for a hydraulic tree branch shear of claim 1 wherein said base of said shear assembly is mounted to said bucket couplers of said skid steer loader.

4. The system for a hydraulic tree branch shear of claim 1 wherein said hydraulic attachment provides said jaw with a predetermined force to cut down a tree branch.

* * * * *